(12) United States Patent
Hu et al.

(10) Patent No.: US 12,210,276 B2
(45) Date of Patent: Jan. 28, 2025

(54) LIGHT-SOURCE SYSTEM AND PROJECTION DEVICE

(71) Applicant: APPOTRONICS CORPORATION LIMITED, Guangdong (CN)

(72) Inventors: Fei Hu, Guangdong (CN); Zuqiang Guo, Guangdong (CN); Yi Li, Guangdong (CN)

(73) Assignee: Appotronics Corporation Limited, Shenzhen (CN)

(*) Notice: Subject to any disclaimer, the term of this patent is extended or adjusted under 35 U.S.C. 154(b) by 815 days.

(21) Appl. No.: 17/336,076

(22) Filed: Jun. 1, 2021

(65) Prior Publication Data

US 2021/0286246 A1 Sep. 16, 2021

Related U.S. Application Data

(63) Continuation of application No. 16/324,081, filed as application No. PCT/CN2017/081490 on Apr. 21, 2017, now Pat. No. 11,048,157.

(30) Foreign Application Priority Data

Aug. 9, 2016 (CN) .......... 201610649657.X

(51) Int. Cl.
*G03B 21/20* (2006.01)
*G02B 26/00* (2006.01)
(52) U.S. Cl.
CPC ......... *G03B 21/206* (2013.01); *G02B 26/008* (2013.01); *G03B 21/20* (2013.01);
(Continued)
(58) Field of Classification Search
CPC ...... G03B 21/00–64; G02B 26/00–129; H04N 9/31–3197
See application file for complete search history.

(56) References Cited

U.S. PATENT DOCUMENTS

2011/0310353 A1 12/2011 Maeda
2013/0100644 A1 4/2013 Hu
(Continued)

FOREIGN PATENT DOCUMENTS

CN 201097088 Y 8/2008
CN 102566230 A 7/2012
(Continued)

OTHER PUBLICATIONS

Office Action received in EP 17838372.5, dated Mar. 24, 2022.
(Continued)

*Primary Examiner* — Bao-Luan Q Le
*Assistant Examiner* — Christopher A Lamb, II
(74) *Attorney, Agent, or Firm* — Knobbe, Martens, Olson & Bear, LLP

(57) ABSTRACT

Provided is a light-source system, comprising excitation light source, first supplementary light source, first light-guiding assembly, wavelength conversion apparatus, and second light-guiding assembly. The excitation light source is for emitting excitation light; the first supplementary light source is for emitting first supplementary light. The first light-guiding assembly is for guiding the excitation light to the wavelength conversion apparatus. The wavelength conversion apparatus is for converting excitation light to excited light and irradiate onto the first light-guiding assembly. The first light-guiding assembly is for guiding excited light to irradiate onto the second light-guiding assembly. At least some components of the second light-guiding assembly are arranged on the light path from the first light-guiding assembly. The second light-guiding assembly is for guiding the excited light and/or the first supplementary light, such that the first supplementary light and at least part of the excited light are output from same emission channel.

20 Claims, 6 Drawing Sheets

(52) U.S. Cl.
CPC ..... *G03B 21/2013* (2013.01); *G03B 21/2033* (2013.01); *G03B 21/204* (2013.01); *G03B 21/2066* (2013.01); *G03B 21/2073* (2013.01)

(56) References Cited

U.S. PATENT DOCUMENTS

| | | | |
|---|---|---|---|
| 2013/0215397 A1 | 8/2013 | Matsubara | |
| 2013/0258639 A1 | 10/2013 | Hu et al. | |
| 2014/0268069 A1 | 9/2014 | Takahashi et al. | |
| 2014/0340649 A1 | 11/2014 | Takahashi | |
| 2015/0253653 A1* | 9/2015 | Fujita | G03B 21/204 353/31 |
| 2015/0323861 A1 | 11/2015 | Saitou | |
| 2015/0354787 A1 | 12/2015 | Chang et al. | |
| 2018/0024426 A1 | 1/2018 | Chen | |

FOREIGN PATENT DOCUMENTS

| | | |
|---|---|---|
| CN | 202306114 U | 7/2012 |
| CN | 103529630 A | 1/2014 |
| CN | 203745790 U | 7/2014 |
| CN | 104765238 A | 7/2015 |
| CN | 104765240 A | 7/2015 |
| CN | 104914657 A | 9/2015 |
| CN | 204759006 U | 11/2015 |
| CN | 105116675 A | 12/2015 |
| CN | 105204279 A | 12/2015 |
| CN | 205992115 U | 3/2017 |
| JP | 2015-106130 | 6/2015 |
| WO | WO 2015/019724 A1 | 2/2015 |

OTHER PUBLICATIONS

Notice of Allowance received in JP 2019-506692, dated Nov. 11, 2020.
Extended European Search Report in corresponding European Patent Application No. 17838372.5 dated Mar. 25, 2020, 7 pages.
Office Action in corresponding Japanese Patent Application No. 2019-506692 dated Mar. 31, 2020, 11 pages.
International Search Report of corresponding Patent Application No. PCT/CN2017/081490—3 pages (Jul. 20, 2017).
Office Action issued in Chinese Application No. 201610649657.X on Dec. 24, 2019.
Office Action issued in Chinese Application No. 201610649657.X on May 29, 2020.

* cited by examiner

LIGHT-SOURCE SYSTEM AND PROJECTION DEVICE

CROSS-REFERENCE TO RELATED APPLICATIONS

The present application is a continuation of U.S. patent application Ser. No. 16/324,081, which is a National Stage of International Application No. PCT/CN2017/081490, filed Apr. 21, 2017, which claims priority to Chinese Patent Application No. 201610649657.X, filed Aug. 9, 2016, all of which are hereby incorporated by reference in their entireties.

TECHNICAL FIELD

The present invention relates to the field of optical technologies, and more particularly to a light source system and a projection device.

BACKGROUND

At present, solid-state light sources have been widely used in general illumination, special illumination and projection display due to their characteristics of long service life and environmental protection etc. Thereamong, white light solid-state light sources have great development potential in the field of illumination.

The prior art provides a white light source that uses excited light to excite fluorescent powder in order to achieve ultra-high brightness. The white light source excites yellow fluorescent powder of YAG:Ce material by adopting a blue-violet laser with a wavelength in a range of 440 nm to 455 nm to generate yellow fluorescence with high-efficiency, and forms blue laser light by adopting a blue laser with a wavelength in a range of 440 nm to 470 nm to complement the yellow fluorescence, by which the yellow fluorescence and the blue laser light are combined to form a white light source.

This type of white light source can be used in the field of projection display where a high brightness light source is required, for example, in single-piece, two-piece, three-piece DLP, LCD or LCOS projectors. The white light emitted by the white light source is divided in spectrum into three primary colors of red light, green light and blue light, which are respectively incident on one or more light modulation components, such as DMD, LCD chip or LCOS chip. The three primary colors of red, green and blue light modulated by the light modulation components are combined in spectrum and output to a screen through a projection lens so as to form a color image.

Due to the high efficiency of the blue-violet laser, thermal stability and long-term reliability thereof are good. The fluorescent powder of YAG:Ce material has high luminescence quantum efficiency and good thermal stability, so the combination of the blue-violet laser and the YAG:Ce fluorescent powder forms a white light source with high efficiency, high reliability, and high brightness. That is, as for two-piece and three-piece projectors, a white light source is generally realized by combining a blue-violet laser and yellow fluorescent powder.

SUMMARY

Technical Problem

However, in a white light source in which a blue-violet laser is used to excite fluorescent powder of YAG:Ce material to form white light, since the spectral intensity of the yellow light emitted by the fluorescent powder of YAG:Ce material which is excited is weak in the red segment, the white light source has a white balance problem, that is, the white light balance point deviates from the Planck blackbody curve, and presents a greenish white color.

In order to avoid the white balance problem of the two-piece and three-piece projectors, the prior art provides a method in which the excessive green light component in the combined white light is filtered out, so that the white balance point restores to the Planck blackbody curve so as to solve the white balance problem. However, since the green light component is filtered out in this method, light emitting efficiency of the white light source is reduced.

In order to solve the white balance problem of the white light source, the prior art provides another method in which a red laser is added to the yellow fluorescence or red fluorescence, for example, a laser with a spectral range of around 638 nm or 650 nm is added to the yellow fluorescence to increase the red light component in the combined light in order to solve the white balance problem.

As shown in FIG. 1, the prior art provides a structure of a light source system in which a red laser is added to the yellow fluorescence. The light source system includes a blue excitation light source 11, a red supplementary light source 12, a light-splitting-and-filtering plate 13 having a center region and an edge region, a color wheel 14, a condensing lens 15, and a light-homogenizing apparatus 16. The center region of the light-splitting-and-filtering plate 13 transmits blue light and red light and reflects green light, while the edge region reflects red, green, and blue light. Thus, the blue excitation light emitted by the blue excitation light source 11 and the red light emitted by the red supplementary light source 12 are transmitted to the color wheel 14 through the center region of the light-splitting-and-filtering plate 13. The yellow fluorescent powder on the color wheel 14 absorbs the blue excitation light while scattering the red light, and emits yellow fluorescence and the scattered red light. The yellow fluorescence and the scattered red light are incident on the light-splitting-and-filtering plate 13 through the condensing lens 15. The green light in the yellow fluorescence incident on the center region of the light-splitting-and-filtering plate 13 is reflected to the light-homogenizing apparatus 16. The yellow fluorescence and the red light incident on the edge region of the light-splitting-and-filtering plate 13 are also reflected to the light-homogenizing apparatus 16, while there is loss in the red light in the yellow fluorescence incident on the center region of the light-splitting-and-filtering plate 13 and the scattered red light when being transmitted.

In the existing white light source mentioned above, the red light emitted from the red supplementary light source is lost by about 5% to 10% caused by being scattered by the fluorescent material, and is lost by about 10% due to being collected by the condensing lens after forming Lambertian light distribution, and then part of the light is lost due to being transmitted by the center region of the light-splitting-and-filtering plate, and this lost part of light is approximately 10%. Therefore, loss of the red light emitted by the red complementary light source is relatively large, and the light utilization rate of the red light is relatively low, which is about 60-70%. While the red complementary light source is of high cost, has higher requirements for heat dissipation, and requires severe heat dissipation conditions, thus, the low utilization rate of the red light will lead to substantial increase in cost, which is disadvantageous. Likewise, in order to get better green light, a method of adding a green laser to the light source is also adopted, which is similar to the above method of adding a red laser and has the problem of low utilization rate either.

For a single-piece projector, the blue-violet laser is adopted to excite blue, green, and red segment sequence to generate sequence of red, green, and blue light to form white light. The blue light is provided by the blue-violet laser itself. The green light is generated by the blue-violet laser exciting the green fluorescent powder. The red light is generated by the blue-violet laser exciting the red fluorescent powder, while the red fluorescent powder have serious efficiency degradation problems when in a higher energy density, resulting in an excessively low red light ratio and affecting white balance and image quality.

In order to avoid the white balance problem of the single-piece projectors, a method of increasing the red color segment is generally used to maintain the white balance in the prior art, however, this will reduce the brightness of the white light and the overall light effect.

Therefore, in view of the deficiencies of the prior art, it is urgent to propose a technical solution capable of improving the utilization rate of complementary light sources such as red and green light.

Technical Solutions

In view of this, the present invention provides a light source system and a projection device to solve the problem of low light utilization rate of red light or light of other color emitted by a complementary light source including a red supplementary light source in the prior art.

In order to achieve the above object, the present invention provides the following technical solution: a light source system including an excitation light source, a first supplementary light source, a first light-guiding assembly, a wavelength conversion apparatus, and a second light-guiding assembly. The excitation light source is configured to emit excitation light. The first supplementary light source is configured to emit first supplementary light. The first light-guiding assembly is configured to guide the excitation light to the wavelength conversion apparatus. The wavelength conversion apparatus is configured to convert the excitation light to excited light and emit the excited light to the first light-guiding assembly. The first light-guiding assembly is further configured to guide the excited light, so that the excited light irradiate onto the second light-guiding assembly. At least some components of the second light-guiding assembly are disposed in a light path of the excited light output from the first light-guiding assembly. The second light-guiding assembly is configured to guide one or both of the first supplementary light and at least part of the excited light to exit through a same light emission channel.

Further, the first light-guiding assembly comprises a light-splitting component and a light-reflecting component, the light-splitting component is configured to transmit/reflect the excitation light and reflect/transmit at least part of the excited light, and the light-reflecting component is configured to guide the at least part of the excited light to the second light-guiding assembly.

Further, the second light-guiding assembly includes a selective optical component, the selective optical component is configured to reflect/transmit the first supplementary light or reflect/transmit the first supplementary light and transmit/reflect at least part of the excited light.

Still further, the selective optical component is a light-filtering plate configured to reflect the first supplementary light and transmit at least part of the excited light, or the selective optical component is a reflecting/polarizing plate that is at least partially coated and configured to reflect the first supplementary light and not to transmit the at least part of the excited light, or the selective optical component is a light-filtering plate that is partially coated or provided with a polarizing plate.

Still further, the second light-guiding assembly further includes a scattering component or/and a light-homogenizing component disposed between the first supplementary light source and the selective optical component.

Still further, the second light-guiding assembly further includes a second condensing lens, the second condensing lens being configured to converge the first supplementary light output from the scattering component or/and the light-homogenizing component to the selective optical component, and a converging focus of the first supplementary light being on the selective optical component.

Further, the light source system further includes a light-filtering apparatus, the light-filtering apparatus being located between the first light-guiding assembly and the second light-guiding assembly, or located in the same light emission channel.

Still further, the wavelength conversion apparatus is a reflective color wheel, the light-filtering apparatus is a light-filtering wheel, and the light-filtering wheels is disposed on an outer circumference or an inner circumference of the reflective color wheel and forms an integral structure with the reflective color wheel.

Still further, the second light-guiding assembly is located between the first light-guiding assembly and the light-filtering wheel, or located at downstream of the light path of the excited light output from the light-filtering wheel.

Still further, the wavelength conversion apparatus is a transmissive color wheel, the light-filtering apparatus is a light-filtering wheel, the light-filtering wheel being disposed separately from the transmissive color wheel, and at least some components of the second light-guiding assembly are located in a gap between the light-filtering wheel and the transmissive color wheel.

Still further, respective rotation axes of the light-filtering wheel and the transmissive color wheel are parallel or coincident to each other.

Still further, the light source system further includes a light-homogenizing apparatus located in the same light emission channel.

Further, the light source system further includes a light-filtering apparatus and a light-homogenizing apparatus, the light-filtering apparatus being located between two components of the first light-guiding assembly, the light-homogenizing apparatus being located in the light emission channel of the excited light output from the light-filtering apparatus, and the first supplementary light source and the second light-guiding assembly being located in a light emission channel of the excited light output from the light-homogenizing apparatus.

Further, the excitation light is blue light, violet light or ultraviolet light.

Further, the first supplementary light is one or more of red light, green light or blue light.

Further, two first supplementary light sources are provided, and the two first supplementary light sources respectively emit red light and green light as the first supplementary light, the second light-guiding assembly further includes a light-splitting component, the red light and the green light irradiate onto the selective optical component through the light-splitting component.

Further, the wavelength conversion apparatus includes a wavelength conversion material, and the wavelength conversion material is a yellow fluorescent powder.

Further, an etendue of the first supplementary light is smaller than an etendue of the excited light.

To achieve the other object above, the present invention provides a projection device including the light source system described above.

Beneficial Effect

Compared with the prior art, the technical solution provided by the present invention has the following advantages:

In the present invention, ratio of the first supplementary light in the combined light can be increased by supplementing the excited light with the first supplementary light, and meanwhile, at least part of the excited light is directly output from the same emission channel through the second optical guiding assembly, and the first supplementary light is not scattered by the wavelength conversion apparatus, thereby avoiding light loss of the first supplementary light due to being scattered by the wavelength conversion apparatus, which greatly improves the light utilization rate of the first supplementary light.

BRIEF DESCRIPTION OF DRAWINGS

In order to more clearly illustrate the embodiments of the present invention or the technical solutions in the prior art, the drawings used in the embodiments or the description of the prior art will be briefly described below. Obviously, the drawings in the following description are only some embodiments of the present invention, and for those skilled in the art, other drawings can be obtained according to these drawings without any creative work.

DESCRIPTION OF EMBODIMENTS

Figure 1:
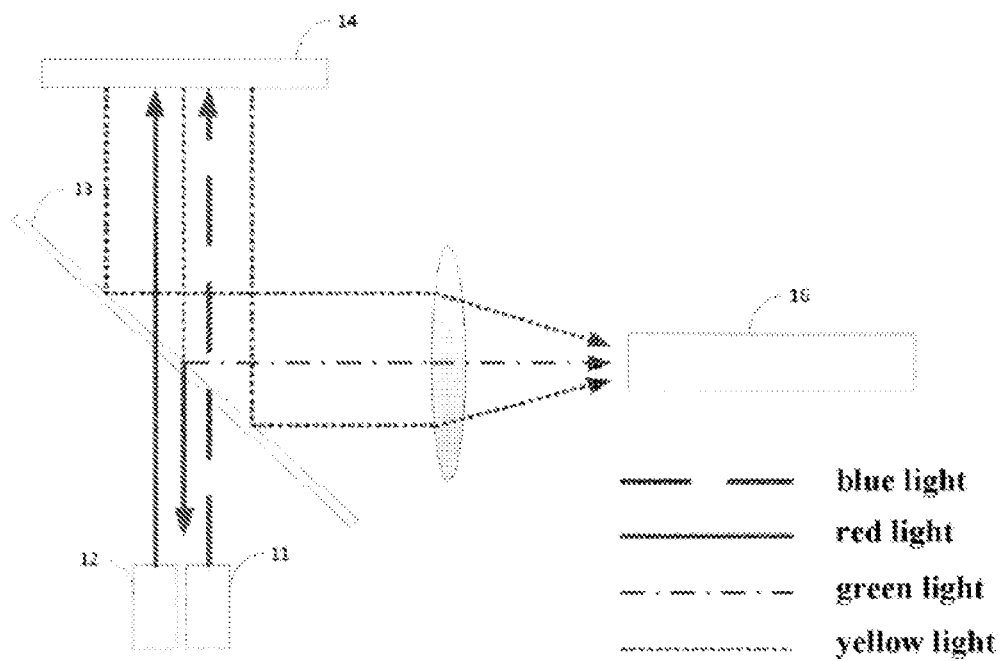
FIG. 1 is a schematic structural view of a light source system provided by the prior art.

The present invention provides a light source system, and the light source system includes at least two light sources, a wavelength conversion apparatus, a first light-guiding assembly and a second light-guiding assembly. The at least two light sources include an excitation light source and a first supplementary light source. The excitation light source is used for emitting excitation light; the first supplementary light source emits a first supplementary light. The first light-guiding assembly is used for guiding the excitation light emitted by the excitation light source to the wavelength conversion apparatus. The wavelength conversion apparatus can convert the excitation light to excited light and emit the excited light to the first light-guiding assembly. The first light-guiding assembly is also used for guiding excited light, causing the excited light to be incident on the second light-guiding assembly. Preferably, an etendue of the first supplementary light is smaller than an etendue of the excited light. The second light-guiding assembly is used for guiding one or both of at least part of the excited light and the first supplementary light, such that the first supplementary light and at least part of the excited light are output from the same light emission channel.

Preferably, the structural dimension of the selective optical component included in the second light-guiding assembly may be set based on one or a combination of the amount of light loss when the excitation light passes through the selective optical component, the amount of light loss when the first supplementary light passes through the selective optical component, and the amount of light loss when the excited light passes through the selective optical component.

The present invention also provides a projection device including the light source system as described above.

The light source system provided by the present invention includes at least two light sources, and the at least two light sources includes an excitation light source and a first supplementary light source. The excitation light emitted by the excitation light source is guided to the wavelength conversion apparatus by the first light-guiding assembly, and the excitation light is converted into excited light by the wavelength conversion apparatus. The excited light is guided by the first light-guiding assembly to the second light-guiding assembly. The etendue emitted by the first supplementary light source is less than the etendue of the excited light. The first supplementary light is combined with at least part of the excited light by the second light-guiding assembly and further guided to the same light emission channel and output therefrom. In this way, by supplementing the first supplementary light in the excited light, the ratio of the first supplementary light in the combined light can be increased. At the same time, since a light-homogenizing apparatus or a light-homogenizing apparatus and a light-filtering apparatus can be disposed on the same light emission channel, the second light-guiding assembly can directly guide the first supplementary light to the light-homogenizing apparatus or guide the first supplementary light through the light-filtering apparatus to the light-homogenizing apparatus without being scattered by the wavelength conversion apparatus, so that the light loss of the first supplementary light caused by being scattered by the wavelength conversion apparatus is avoided, greatly improving the light utilization rate of the first supplementary light which is, for example, red light, and probably the light utilization rate of red light can be increased up to more than 80%.

The above is the core conception of the present invention. In order to make the objects, features and advantages of the present invention more apparent, specific embodiments of the present invention will be described in detail in connection with the accompany drawings.

In the following description, numerous specific details are set forth in order to provide a full understanding of the present invention, but the present invention may be implemented in other ways than those described herein, and those skilled in the art can make similar applications without departing from the scope of the present invention. The present invention is not limited by the specific embodiments disclosed below.

Secondly, the present invention will be described in detail in conjunction with the schematic diagrams. When the embodiments of the present invention are described in detail, for the convenience of description, the cross-sectional view of the structure of the apparatus may not be partially enlarged according to the general ratio, and the schematic diagram is only an example, which should not limit the protection scope of the present invention. In addition, three-dimensional dimensions of length, width and depth should be included in the actual production.

The present invention will be described in detail with several embodiments.

Embodiment One

Figure 2:
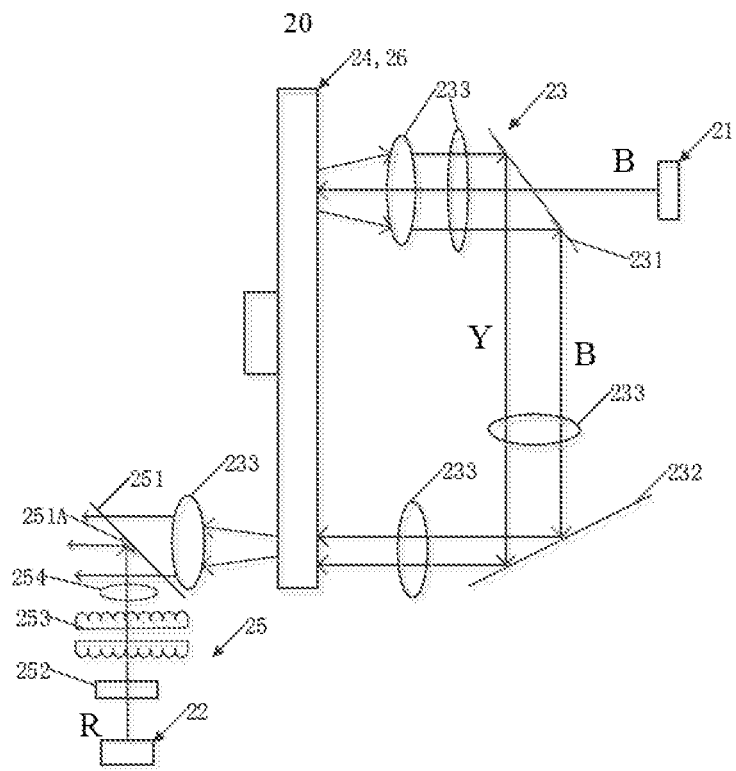
FIG. 2 is a schematic structural diagram of a light source system according to a first embodiment of the present invention.

The present embodiment provides a light source system 20. As shown in FIG. 2, the light source system 20 includes two light sources respectively being an excitation light source 21 and a first supplementary light source 22, and also includes a first light-guiding assembly 23, a wavelength conversion apparatus 24, and a second light-guiding assembly 25. In the present embodiment, as an example, the wavelength conversion apparatus is a reflective color wheel 24 (such as a wavelength conversion layer directly coated on a reflective substrate). Of course, the wavelength conversion apparatus may also be a transmissive wavelength conversion apparatus (such as a transparent plate and a wavelength conversion material doped in the transparent plate). Wavelength conversion materials include, but are not limited to, fluorescent powder, quantum dot materials, and the like. The wavelength conversion layer is a wavelength conversion material layer or a plate obtained by sintering a wavelength conversion material and an adhesive. Preferably, the wavelength conversion material may be a yellow fluorescent powder, a yellow-green fluorescent powder, a green fluorescent powder or the like. As a specific embodiment, the first light-guiding assembly 23 includes a light-splitting component which is, for example, an all-reflective plate 231 which is partially coated, and a light reflecting component which is, for example, a reflecting mirror 232, while the light-splitting component and the light reflecting component are oppositely disposed. As a specific arrangement of the all-reflective plate 231 and the reflecting mirror 232, the all-reflective plate 231 and the reflecting mirror 232 are both disposed at an angle of 45° with respect to the horizontal plane but with different orientations. The all-reflective plate 231 is partially coated at a region corresponding to the incidence of the excitation light so as to transmit the excitation light and to reflect the excited light, while other regions are all set to reflect the excited light, the excitation light, or both. Further, in order to improve the light purity of the excited light or the excited light and the first supplementary light (described further below), an annular light-filtering wheel may be disposed at an outer circumference or an inner circumference of the circular color wheel. In other words, the reflective color wheel and the light-filtering wheel form an integral structure. In the present invention, the structure in which the annular light-filtering wheel is disposed on the outer circumference of the circular color wheel is taken as the example of the integral structure of the reflective color wheel and the light-filtering wheel. The type and partitions of the wavelength conversion material on the reflective or transmissive color wheel, and the type and partition of the light-filtering plate of the corresponding integral or partitioned light-filtering wheel (described further below) may be determined according to the actual situation, while the partitions of the color wheel and the light-filtering wheel have their respective rotation angles matched. In order to improve the utilization rate of the excitation light and the excited light, the first light-guiding assembly 23 may also include first condensing lenses 233 disposed each between the all-reflective plate 231 and the reflective color wheel 24, between the all-reflective plate 231 and the reflecting mirror 232, between the reflecting mirror 232 and the light-filtering wheel 26, and between the light-filtering wheel 26 and the second light-guiding assembly 25. The first condensing lens 233 may be a convex lens, a concave lens, or a combination of the two, or the like, and moreover, number of the first condensing lenses 233 can be determined according to actual needs.

The excitation light source 21 and the first supplementary light source 22 described above are used to emit the excitation light and the first supplementary light, respectively. The excitation light source 21 and the first supplementary light source 22 each include a solid state light emitting assembly, and the solid state light emitting assembly is a single solid state light emitting component or an array of solid state light emitting components including a plurality of solid state light emitting components. The solid state light emitting component may be a laser diode (LD) or a light emitting diode (LED) or the like. The excitation light is blue light, violet light, or ultraviolet light or the like. The spectral range of the first supplementary light is different from the spectral range of the excitation light, and the spectral range of the first complementary light is narrower than the spectral range of the excited light, thereby increasing the color saturation of the combined light of the excited light and the first complementary light. Preferably, the etendue of the first supplementary light is smaller than the etendue of the excited light. For example, the color of the first supplementary light emitted by the first supplementary light source 22 can be set according to different requirements for the excited light. For example, when light of a certain color is missing or insufficient in the excited light, the first supplementary light is light of that color. For example, the first supplementary light may be one or more of red light, green light, blue light, or the like. Preferably, the color of the first supplementary light is consistent with a certain color of the light that is missing or insufficient in the excited light, and the first supplementary light is, for example, a laser light emitted by a solid state light source while the excited light is fluorescence generated, for example, by the wavelength conversion material being excited. Because there is overlapping between the spectra of the excited light and the fluorescence, it is possible to obtain better image quality and higher light-supplementing efficiency by performing light-combination by etendue of the excited light and the fluorescence.

The second light-guiding assembly 25 includes a selective optical component 251. In addition, in order to obtain a better light-emitting effect of the first supplementary light, the second light-guiding assembly 25 further includes a scattering plate 252 which is disposed between the first supplementary light source 22 and the optional optical component 251 and may serve as a scattering component, and a fly-eye lens pair 253 which can be used as a light-homogenizing component. The scattering plate 252 can perform decoherence processing to the first supplementary light output by the solid state light emitting assembly included in the first supplementary light source 22. The scattering plate 252 may be a rotating scattering plate, a vibrating scattering plate, or the like. Since decoherence processing to the first supplementary light output by the solid state light emitting assembly is performed by the scattering plate 252, the speckle phenomenon in the combined light of the excited light and the first complementary light is avoided. In addition, preferably, a second condensing lens 254 is disposed between the fly-eye lens pair and the selective optical component 251, so that the first complementary light can be converged at the selective optical component 251 after being homogenized by the fly-eye lens pair. Preferably, the mutual position of the second condensing lens 254 and the selective optical component 251 is configured such that the converging focus of the first complementary light is positioned on the selective optical component 251. Since the converging focus of the first supplementary light is on the selective optical component 251 and the selective optical component 251 reflects the first supplementary light to the light emission channel, an area of a region, which is used for reflecting the first supplementary light, on the selective optical component 251 is reduced. Correspondingly, it is possible to reduce the light loss of the excited light whose spectral range is close to that of the first supplementary light and the excited light containing a portion of light within the spectral range when the excited light passing through said region and being reflected, thereby improving the light utilization rate. In addition, the first light-guiding assembly may further include a square bar (not shown) that can function as a light-homogenizing apparatus, and the square bar is disposed between the first condensing lens 233 and the light-filtering wheel 26 between the light-filtering wheel 26 and the second light-guiding assembly 25.

The following is a detailed description of the selective optical component. It can be understood that any of the selective optical components described below can be applied not only to the present embodiment but also to other embodiments unless otherwise stated. The selective optical component reflects the first supplementary light or reflects the first supplementary light and transmits at least part of the excited light. In an implementation, the selective optical component is a light-filtering plate including a center film and an edge film, wherein the center film is smaller in dimension than the edge film. The center film and the edge film may be an integral film or separate films. The dimension of the center film may be set according to one or a combination of the light loss amount of the first supplementary light when passing through the center film, the light loss amount of the excitation light when passing through the center film, or the light loss amount of the excited light passing through the center film. In another implementation, the selective optical component is an individual reflecting plate or polarizing plate, or the selective optical component includes a reflecting plate or a polarizing plate and a fixing member for fixing the reflecting plate or the polarizing plate (not shown in drawing). A coating is disposed on the reflecting plate or the polarizing plate such that the reflecting plate or the polarizing plate reflects the first complementary light and at least part of the excited light is transmitted from the reflecting plate without being reflected. Preferably, the first complementary light is incident on one of reflecting plate and the polarizing plate and forms a spot, while the dimension of the reflecting plate and the polarizing plate matches this spot, that is, the entire area of the reflecting plate or the polarizing plate is coated, so that it is possible to reduce the adverse effect of the reflecting plate or the polarizing plate on the reflection of the excited light. In addition, it is possible that the reflecting plate does not include a coating, and in the excited light, portion of excited light incident on the reflecting plate is totally reflected without being transmitted, resulting in that this portion of excited light is subject to a relatively large light loss, but the cost can be reduced with respect to the case in which a coating is disposed on the reflecting plate. In still another implementation, the selective optical component is a light-filtering plate, and the light-filtering plate is provided with a first coating or a polarizing plate at the center region. For the case where a coating is provided at the center region of the light-filtering plate, one side of the coating region of the light-filtering plate reflects the first supplementary light, while the other side transmits the excited light or transmits part of the excited light but reflects the light, of which the spectral range is close to that of the first complementary color, in the excited light, causing a certain loss. In the case where a polarizing plate is provided at the center region of the light-filtering plate, the edge region of the light-filtering plate transmits the excited light, and the polarizing plate is a polarizing plate for the first complementary light, that is, this polarizing plate reflects the first supplementary light having the first polarization state and transmits the second supplementary light having the second polarization state. However, it can be seen that, in general, for the first supplementary light source 22 including the solid state light emitting assembly, the first supplementary light emitted by the first complementary light source 22 can be controlled to be a light having substantially one polarization state, such as a P state. Therefore, the polarizing plate reflects the first complementary light having the P-polarization state, and at the same time, transmits partial excited light, which has an S-polarization state, in the excited light. However, for example, the fluorescence which can serve as excited light includes light having two polarization states of both the P state and the S state, and thus, by providing a polarizing plate in the light-filtering plate at the region corresponding to the incidence of the first complementary light, the light, of which the polarization state is different from that of the first complementary light, in the excited light and the first complementary light can be guided to emit from the same light emission channel. Therefore, only light of P-polarization state of the light that passes through the polarizing plate region in the excited light is reflected and lost, which decrease loss of the excited light when passing through the polarizing plate, and the utilization efficiency of the excited light is higher. In another implementation, the selective optical component is a wavelength light-filtering plate with a second coating provided at the center region. The second coating has different light-filtering curves for light of different polarization states. For example, in the case where the first complementary light is red light of P-polarization state and the excited light includes green, blue and red light having two polarization states respectively, the second coating can reflect the first complementary light which is red light of polarization state P, and transmits green light of P and S-polarization states in the excited light, blue light of P and S-polarization states, and red light of S-polarization state, while only the red light with P-polarization state will be reflected by the second coating and lost. Therefore, when comparing with the case where a polarizing plate is provided at the center region of the light-filtering plate and only allows light of one of the two polarization states included in each light to be transmitted, the second coating may allow light of two polarization states included in part of each light to be transmitted, which further reduces the loss of the excited light passing through the second coating. Preferably, in the above various embodiments, the center film of each light-filtering plate, the first coating provided at the center region, an area of the polarizing plate at the center region, or an area of the second coating provided at the center region of the wavelength light-filtering plate are smaller than 50% of the useful spot area. The useful spot area refers to the area of the spot formed on the entire light-filtering plate by the excited light output from the wavelength conversion apparatus. In addition, it can be understood that the above description of the positions of the center and the center region are not essential, which can be adjusted according to actual needs. It should also be noted that the above describes a case where the selective optical component reflects the first supplementary light or reflects the first supplementary light and transmits at least part of the excited light, however, according to the needs of light path design, optical component layout and so on, it is also possible to make appropriate adjustment by referring to any of the above selective optical components, so that the selective optical component transmits the first supplementary light or transmits the first supplementary light and reflects at least part of the excited light.

The light source system provided by the embodiment of the present invention will be described below in a specific example with reference to FIG. 2. It is assumed that the excitation light emitted by the excitation light source 21 is the blue excitation light B, and the first complementary light emitted by the first supplementary light source 22 is the red light R. In addition, it may be implemented that the first supplementary light may also be green light, or the first supplementary light may include red light and green light. The wavelength conversion apparatus is a reflective wavelength conversion apparatus, and the wavelength conversion material is yellow fluorescent powder. The light path principle of the light source system 20 is as follows. The blue excitation light B sequentially passes through the all-reflective plate 231 with a coating provided at a region and the first condensing lens 233 so as to be incident on the color wheel 24, and the yellow excited light Y generated by the yellow fluorescent powder of the excitation color wheel 24 or the yellow excited light Y and the unconverted blue excitation light B are reflected to the first condensing lens 233. Then the yellow excited light Y is reflected by the all-reflective plate 231, and the unconverted blue excitation light B is reflected by regions of the all-reflective plate except for the area other than the coating region where the excitation light is incident. After that, the yellow excited light Y or the yellow excited light Y and the unconverted blue excitation light B are guided to the first condensing lens 233 and the reflecting mirror 232 to be incident on the light-filtering wheel 26, and then pass through the light-filtering wheel 26 so as to be incident on the light-filtering plate 251 which serves as a selective optical component and is provided with a polarizing plate 251A at the center region. The light, of which the polarization state is different from that of the first complementary light, in the yellow excited light Y irradiate onto the polarizing plate 251A is transmitted and the light of which the polarization state is the same as that of the first complementary light is reflected by the polarizing plate 251A, which results in loss. Therefore, the light, which is reflected by the polarizing plate and has a polarization state that is different from that of the first complementary light, in the excited light is reduced, thereby improving the utilization rate of the excited light. The yellow excited light Y irradiate onto the region other than the polarizing plate 251A of the light-filtering plate 251 is transmitted. The red light R emitted by the first supplementary light source 22 is de-coherent processed by the scattering plate 252 and is homogenized by the fly-eye lens pair 253, and then is converged at the polarizing plate 251A and is reflected to the light emission channel. In this way, the excited light can be supplemented with red light R, and the red light R of the first complementary light and the red excited light can achieve light-combination by etendue through the polarizing plate 251A. Since the red light R is directly guided to the light emission channel by the polarizing plate 251A without being scattered by the wavelength conversion apparatus, light loss of the red light R is reduced and the light utilization rate of the red light R is improved. It can be seen that the red light R and the yellow excited light Y can be incident on the light modulation components, such as a one-piece or three-piece DMD light modulation components, through the same light emission channel.

In the present embodiment, the first light-guiding assembly guides the excitation light emitted by the excitation light source to the wavelength conversion apparatus and guides the excited light output from the wavelength conversion apparatus to the light-filtering apparatus so as to be incident on the second light-guiding assembly, and moreover, the second light-guiding assembly guides the first supplementary light emitted by the first supplementary light source to be combined with the excited light incident on the second light-guiding assembly in order to irradiate into the light emission channel. Since the first supplementary light is not scattered by the wavelength conversion apparatus, light loss of the first supplementary light is greatly reduced, thereby improving light-supplement efficiency of the first supplementary light.

It should be emphasized that in order to make the description more concise, description of other embodiments and the components and structures in the corresponding drawings that are the same as those of the Embodiment One can be obtained with reference to the above description and will not be repeated.

Embodiment Two

Figure 3:
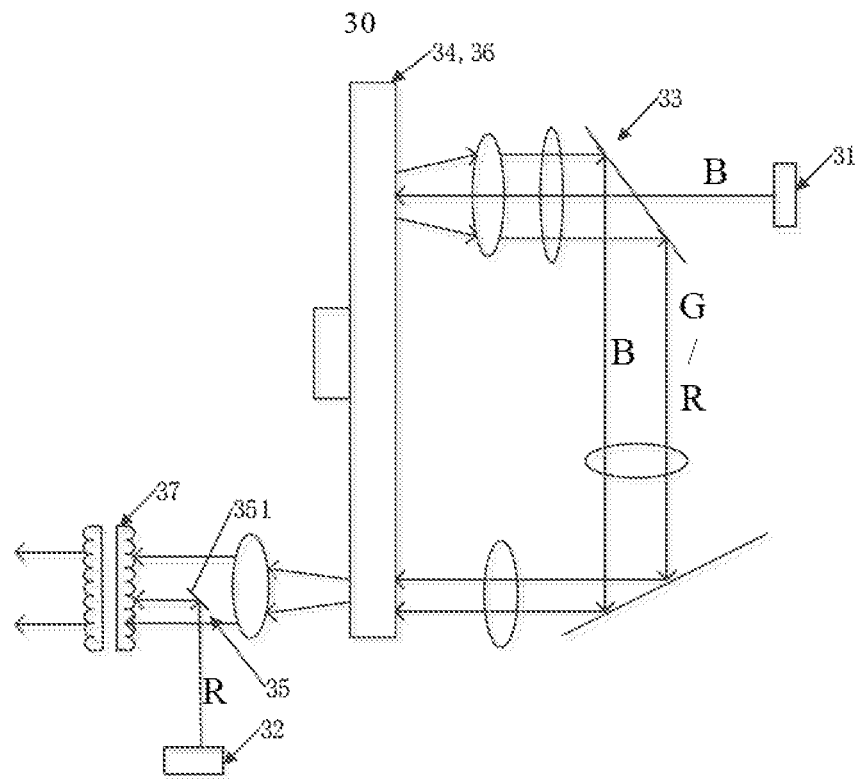
FIG. 3 is a schematic structural diagram of a light source system according to a second embodiment of the present invention.
Figure 4:
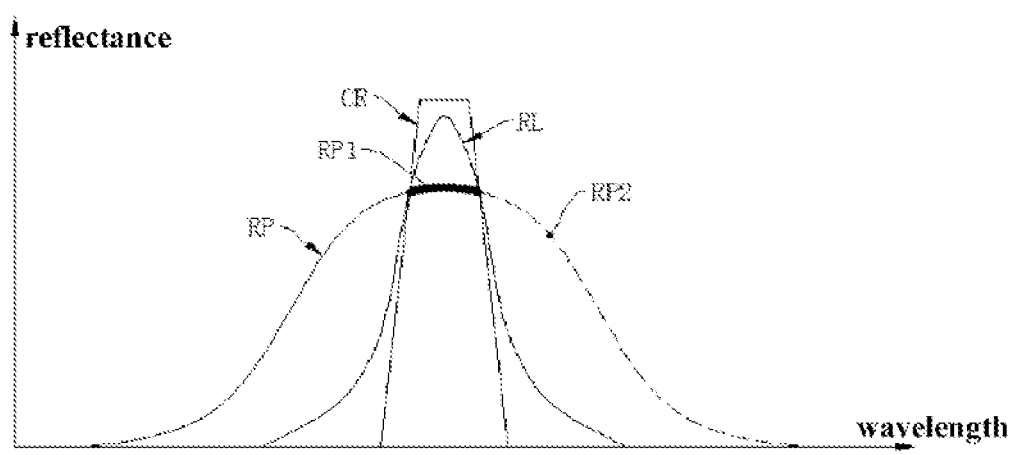
FIG. 4 is a schematic diagram showing a corresponding relationship between reflectance of coating of a selective optical component and spectra of a first complementary light and excited light in the embodiment shown in FIG. 3.
Figure 5:
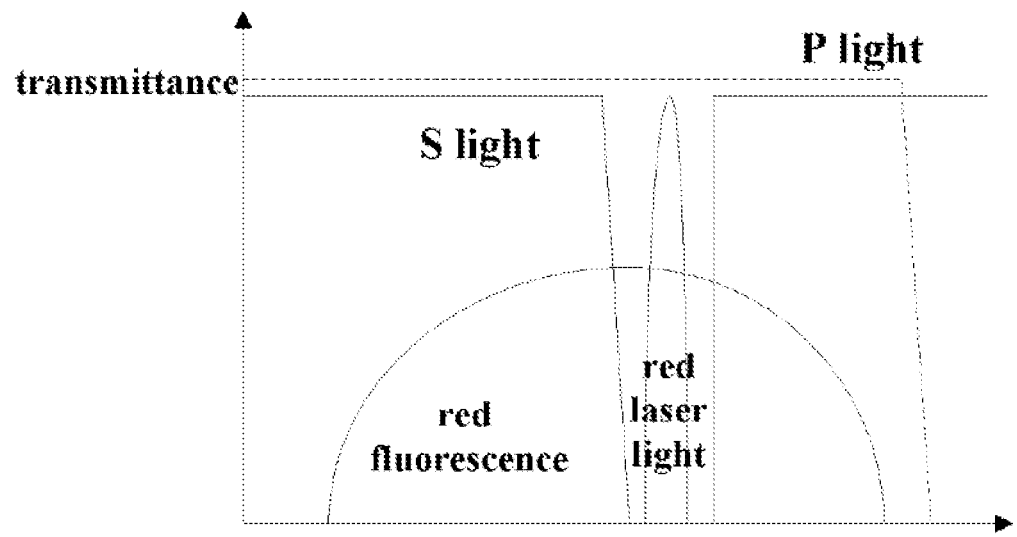
FIG. 5 is a schematic diagram showing a corresponding relationship between transmittance of coating of a selective optical component and spectra of a first complementary light and excited light in another implementation of the second embodiment of the present invention.

The present embodiment provides another light source system 30. As shown in FIG. 3, the main difference between the light source system 30 and the light source system 20 shown in FIG. 2 lies in the arrangement of the second light-guiding assembly 35. Specifically, the second light-guiding assembly 35 is different from that of Embodiment One, wherein the scattering component and the light-homogenizing component are not disposed between the selective optical component 351 and the first supplementary light source 32, and further, a light-homogenizing apparatus 37 is disposed on the same light emission channel of the first supplementary light and the excited light. The above-described light source system 30 provided by the embodiment is described below with a specific example. It is assumed that the excitation light emitted from the excitation light source 31 is blue excitation light B, the first supplementary light emitted by the first supplementary light source 32 is red light R, the wavelength conversion apparatus is a reflective color wheel 34, and the wavelength conversion material is excited by the excitation light to generate one or more of the excited light of blue B, green G, and red R, while specific condition of the excited light may be determined according to the number and type of the light modulation component. By guidance of the first light-guiding assembly 33, the excited light is output from the reflective color wheel 34 and incident on the light-filtering wheel 36. The excited light output from the light-filtering wheel 36 is further incident on the selective optical component 351 of the second light-guiding assembly 35, and irradiate to the fly-eye lens pair 37, which can be used as a light-homogenizing apparatus, together with the red light R, which can serve as the first supplementary light. Moreover, in the present embodiment, the first supplementary light source 32 adopts an array of red lasers which emits a red laser R, and the excitation light source 31 adopts an array of blue lasers which emits a blue laser B. The blue laser B excites the fluorescent material, which can be used as a wavelength conversion material, on the reflective color wheel 34 to generate one or more of the above-mentioned fluorescence. The red laser R and the red fluorescence adopt a method of light-combination by etendue at the coating of the selective optical component 351. Referring to FIG. 4, FIG. 4 schematically shows the spectrum RP of the red laser, spectrum RL of the red fluorescence, and the reflectance curve CR of the coating of the selective optical component 351. Since the wavelength range of the spectrum of the red laser is narrow and the wavelength range of the spectrum of the red fluorescence spectrum is wide, as for a certain range of the peak wavelengths of the red laser spectrum RL and the red fluorescence spectrum RP, the wavelength range corresponding to part of the red fluorescence spectrum RP1 (shown by the thickened curve in FIG. 4) has an overlapping portion with both the wavelength range of the reflectance curve CR and the reflectance curve CR. Therefore, it can be seen that when the coating is reflecting the red laser, it will inevitably reflect the red fluorescence having the corresponding wavelength of the overlapping portion, thereby causing a certain loss of red fluorescence. However, since the wavelength range of the red fluorescence spectrum is relatively wide, by appropriately setting the band pass and band elimination of the coating, the red fluorescence corresponding to the wavelength range of part of the red fluorescence spectrum RP2 (shown by the dotted line in FIG. 4) located on the right side of the thickened curve RP1 will not be reflected but instead will be transmitted and output together with the red laser, thereby improving the utilization rate of the excited light. In addition, the red laser occupies a small region at the center of the fly-eye lens pair 37, and the fluorescence of one or more of the above blue B, green G, and red R occupies the remaining region, finally imaging onto the light modulation component. Both the red laser and the fluorescence can form a spot with good uniformity, and the spot is finally formed into an image by the projection lens and is observed by the human eye. Therefore, the fly-eye lens is fully utilized to homogenize the light to form a good surface distribution, such that the cost is reduced by omitting optical components such as the scattering component and the light-homogenizing component, and meanwhile, it is still possible to ensure that the output light is within an acceptable range. Further, referring further to FIG. 5, in still another implementation, as regarding to the selective optical component 351 having a coating with characteristics shown in FIG. 4 mentioned above, the selective optical component 351 can also be further modified to improve the polarization state characteristics shown in FIG. 5. For example, in a feasible modification, the modified selective optical component can be obtained by providing a coating on the polarizing plate, and the modified selective optical component has the reflectance and transmittance characteristics shown in FIGS. 4 and 5 described above. When the red laser R is light of S-polarization state light and the excited light is red fluorescence and includes light having polarization states of both P-state and S-state, the modified selective optical component reflects the red light R of S-polarization state, and moreover, in addition to the loss caused by reflecting light of S-polarization state in the red fluorescence of which the wavelength range is substantially the same as the wavelength corresponding to the spectral range of the red laser R, light having polarization states of both P-state and S-state in the red fluorescence located outside the substantially same wavelength range described above can be transmitted through the modified selective optical component 351, making it possible to significantly reduce the loss of red fluorescence while ensuring that the red laser R has high light-supplement efficiency. Therefore, according to the description above, with the modified selective optical component 351, it is possible to optically realize light-combination by etendue and polarization state light-combination of the red laser and the red fluorescence incident thereon.

Embodiment Three

Figure 6:
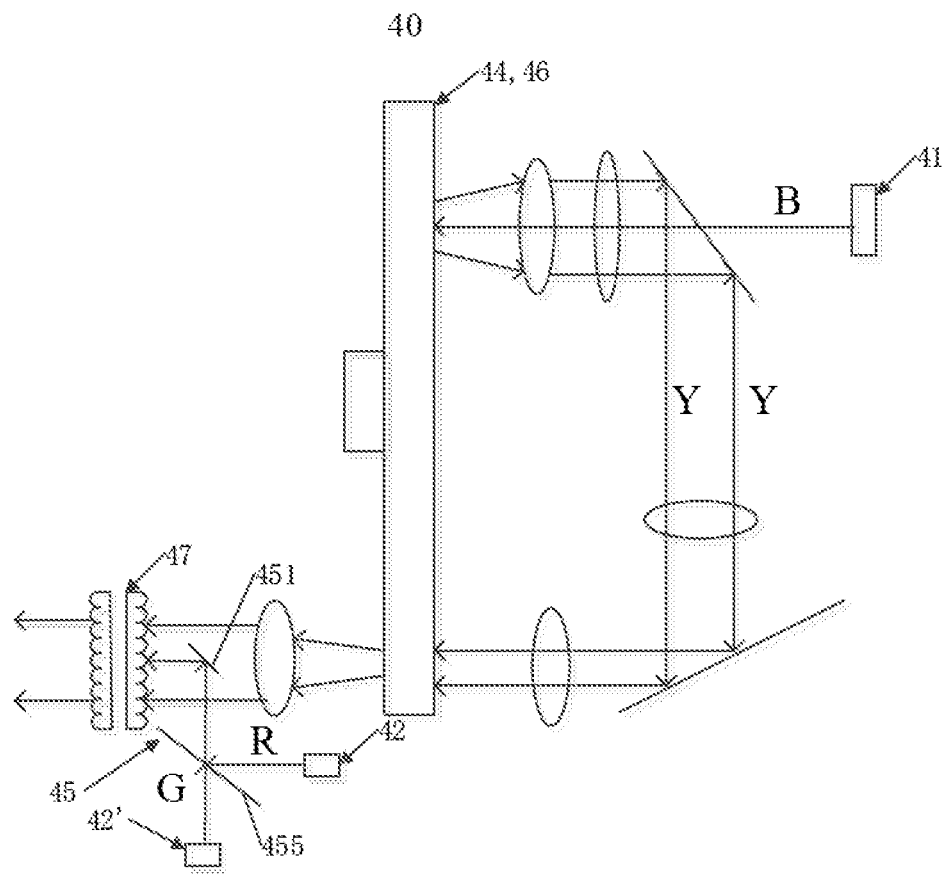
FIG. 6 is a schematic structural diagram of a light source system according to a third embodiment of the present invention.

The present embodiment provides another light source system 40. As shown in FIG. 6, the main difference between the light source system 40 and the light source system 30 shown in FIG. 3 lies in that a first supplementary light source 42' is added. Specifically, the first supplementary light source 42 and the first supplementary light source 42' are disposed on the same side of the selective optical component 451, and the first supplementary light source 42' and the first supplementary light source 42 are located on two sides of the light-splitting element 455 included in the second light-guiding assembly 45. The light-splitting element 455 splits light by wavelength such that a portion of the light emitted from the first supplementary light source 42' and the first supplementary light source 42 is transmitted while the other portion is reflected and output from the same light path to the selective optical component 451. Therefore, even if two first supplementary light sources are provided, it is not necessary to enlarge the area, which corresponds to the incident region of the first supplementary light, of the selective optical component 451, so as to avoid increase of light loss when passing through the selective optical component 451. In addition, it should be noted that for two or more first supplementary light sources that emit two or more different colors of light, these first supplementary light sources may also respectively emit light through different second light-guiding assemblies corresponding thereto. For example, it is assumed that two first supplementary light sources emit two different colors of light, and with respect to the direction of the light path along which the excited light passes through the light-filtering wheel, one first supplementary light source and the second light-guiding assembly corresponding thereto are disposed in front of the light-filtering wheel, while the other first supplementary light source and the second light-guiding assembly corresponding thereto are disposed behind the light-filtering wheel. In addition, it should be noted that a solid-state light source capable of emitting light of two different colors may also be disposed in a first supplementary light source, and the lights of two different colors irradiate onto the second light-guiding assembly in substantially parallel directions. The above-described light source system 40 provided by the present embodiment is described below with a specific example. It is assumed that the excitation light emitted from the excitation light source 41 is blue laser B, the first supplementary light emitted by the first supplementary light source 42 is red light R, the first supplementary light emitted by the first supplementary light source 42' is green light G, the wavelength conversion apparatus is a reflective color wheel 44, and the wavelength conversion material is excited by the excitation light to generate a yellow excited light Y or a yellow excited light Y and an unconverted blue excitation light (not shown). With the guidance of the first light-guiding assembly 43, the excited light is output from the reflective color wheel 44 and is incident on the light-filtering wheel 46, and the excited light output from the light-filtering wheel 46 is further incident on the second light-guiding assembly 45 and then irradiate to the fly-eye lens pair 47, which can function as a light-homogenizing apparatus, together with the red light R or/and the green light G reflected by the selective optical component 451. In the present embodiment, since the number of the first supplementary light sources is two and they respectively emit red light R and green light G as the first supplementary light, for example, the red fluorescence and the green fluorescence, which serve as excited light, can be supplemented with red light R and green light G respectively according to actual needs, thereby obtaining better image quality.

Figure 7:
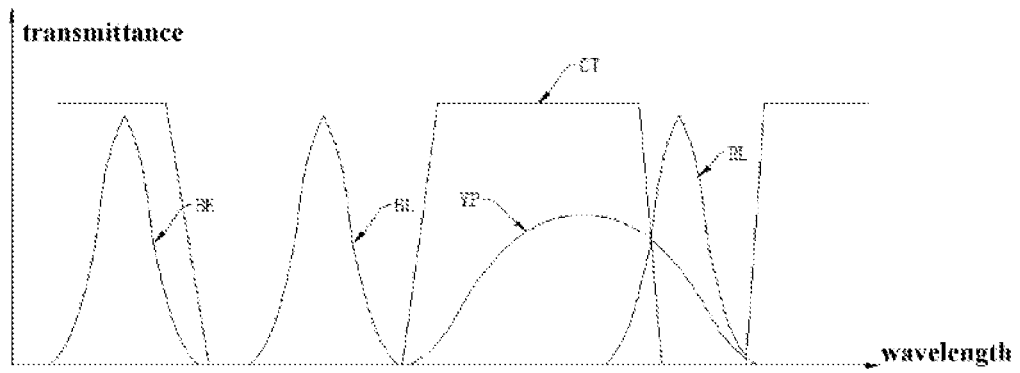
FIG. 7 is a schematic diagram showing a corresponding relationship between transmittance of coating of a selective optical component and spectra of a first complementary light and excited light in another implementation of the third embodiment of the present invention.

In addition, in still another implementation, the color of the light emitted from first complementary light source 42' can be changed into blue from green. That is, the two first supplementary light sources respectively emit a supplementary blue laser and a supplementary red laser. The excitation blue laser emitted by the excitation light source 41 excites the wavelength conversion material to generate yellow fluorescence. Preferably, the excitation light source 41 that does not excite the wavelength conversion material does not operate when the first complementary light source that emits blue laser is operating. With further reference to FIG. 7, FIG. 7 schematically shows the spectrum BE of the excitation blue laser, the spectrum BL of the complementary blue laser, the spectrum RP of the complementary red laser, the spectrum YP of the yellow fluorescence, and the transmittance curve CT of the coating of the selective optical component 451, while the wavelength range of the blue laser emitted by the first complementary light source is greater than that of the blue laser emitted by the first light source 41. Specifically, a blue laser close to blue-violet is used as the excitation blue laser to excite the fluorescent powder, and since the excitation efficiency of the blue laser which is blue-violet is higher than that of the blue laser of other wavelengths, it is possible to achieve highly efficient fluorescence excitation and also guarantee the purity of the color gamut by using a short-wavelength excitation blue laser to excite the fluorescent powder and adopting a supplementary blue laser of a slightly longer wavelength as the blue primary light of the light source system. Moreover, by properly setting the transmittance curve of the coating, the coating can transmit most of the yellow fluorescence while transmitting the excitation blue laser and reflecting the supplementary blue laser and the supplementary red laser. Therefore, the coating having the transmittance curve characteristics shown in FIG. 7 can reduce loss of the excited light while ensuring the light-supplement efficiency of the supplementary light. In addition, since the yellow fluorescence Y, which is generated by the excitation blue laser B emitted from the excitation light source 41 exciting the reflective color wheel 44, substantially does not include blue light, by setting a first complementary light source that emits a blue laser, the color coordinate of the blue light is set to be more conform to the color gamut requirement. When part or all of the blue light of the light source system is provided by the blue light emitted by the first supplementary light source, the color coordinate of the blue light will be better, and of course, the utilization rate is also higher. In addition, both the excitation blue laser and the first supplementary light can be reflected by the selective optical component 451 and output to the same light emission channel together with the yellow excited light Y. The supplementary blue laser emitted by the first supplementary light source is closer to the subsequent light path. Therefore, the supplementary blue laser does not need to pass through the first light-guiding assembly so as to reduce the inevitable light loss caused by the supplementary blue laser passing through the respective components of the first light-guiding assembly, and the situation in which the light source system 40 requires a relatively large amount of blue light can be satisfied.

Embodiment Four

Figure 8:
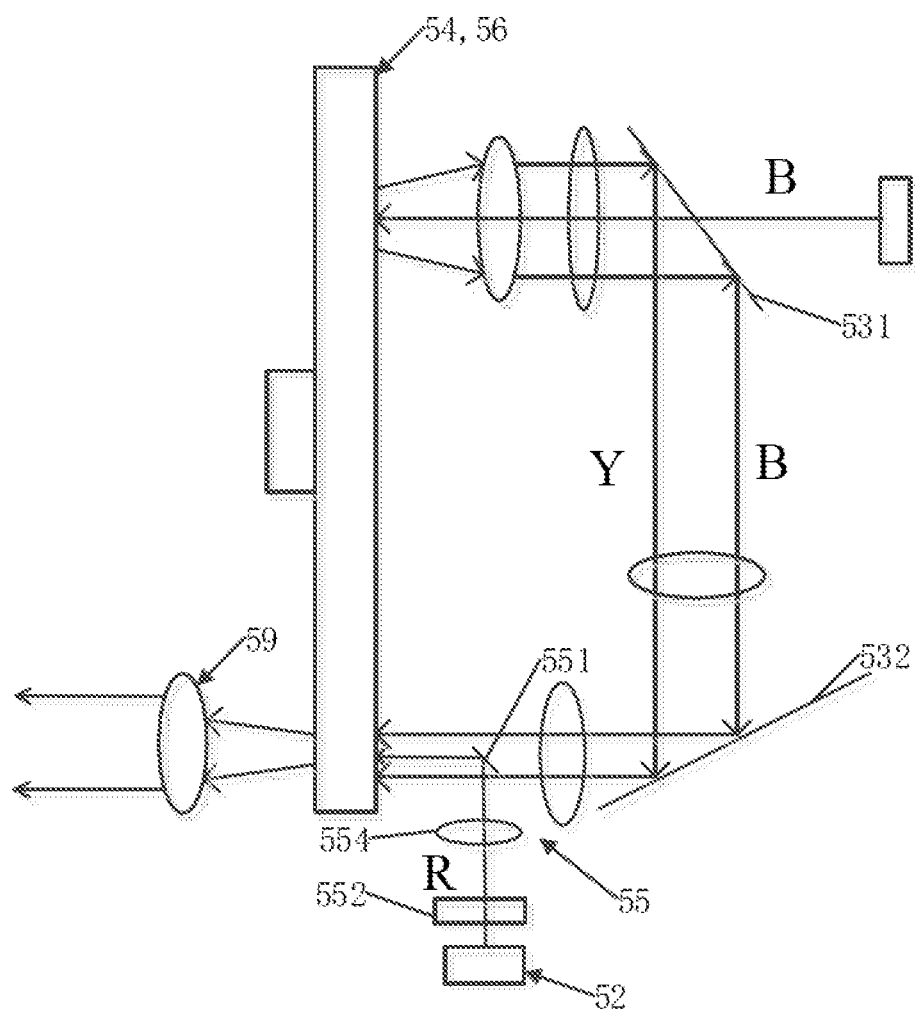
FIG. 8 is a schematic structural diagram of a light source system according to a fourth embodiment of the present invention.

The present embodiment provides another light source system 50. As shown in FIG. 8, the main difference between the light source system 50 and the light source systems shown in FIGS. 2, 3 and 6 lies in positions of the first supplementary light source 52 and the second light-guiding assembly 55, and the components included in the second light-guiding assembly 55. Specifically, with respect to the light path along which the excited light is incident on the light-filtering wheel that can be used as the light-filtering apparatus, the second light-guiding assembly 55 in each of the above embodiments is disposed behind the light-filtering wheel, while the second light-guiding assembly 55 in the present embodiment is disposed in front of the light-filtering wheel 56. As a specific example of the present embodiment for providing description of the light source system 50 described above, the case where the excitation light and the excited light are included is the same as that in Embodiment One, and will not be repeated here. Referring to FIG. 8, red light R, which may serve as the first supplementary light, is reflected by the selective optical component 551 of the second light-guiding assembly 55 and irradiate onto the light-filtering wheel 56 together with the yellow excited light Y or the yellow excited light Y and the unconverted blue excitation light B. In the present embodiment, the selective optical component 551 of the second light-guiding assembly 55 is disposed between the reflecting mirror 532 and the light-filtering wheel 56. The selective optical component 551 guides the red light R reflected therethrough and the yellow excited light Y or the yellow excited light Y and the unconverted blue excitation light B reflected by the reflecting mirror 532 to the light-filtering wheel 56. In addition, as an alternative implementation, the selective optical component 551 of the second light-guiding assembly 55 may also be disposed between the all-reflective plate 531 which is partially coated and the reflecting mirror 532 (not shown), and the selective optical component 551 guides the red light R reflected therethrough and the yellow excited light Y or the yellow excited light Y and the unconverted blue excitation light B reflected by the all-reflective plate 531 to the reflecting mirror 532 and further to the light-filtering wheel 56. Further, the excited light and the first supplementary light are further incident on a third condensing lens 59 and the light-homogenizing apparatus (not shown) after passing through the light-filtering wheel 56. Preferably, in the present embodiment, the second light-guiding assembly 55 further includes a scattering plate 552 and a fourth condensing lens 554 disposed between the first supplementary light source 52 and the selective optical component 551. Advantages of providing the scattering plate 552 and the third condensing lens 554 can be referred to the relevant contents in Embodiment One described above. In the present embodiment, since the positions at which the first supplementary light source and the second light-guiding assembly are disposed utilize the gap between the reflecting mirror 532 and the light-filtering wheel 56, the structure of the light source system can be made more compact.

Embodiment Five

Figure 9:
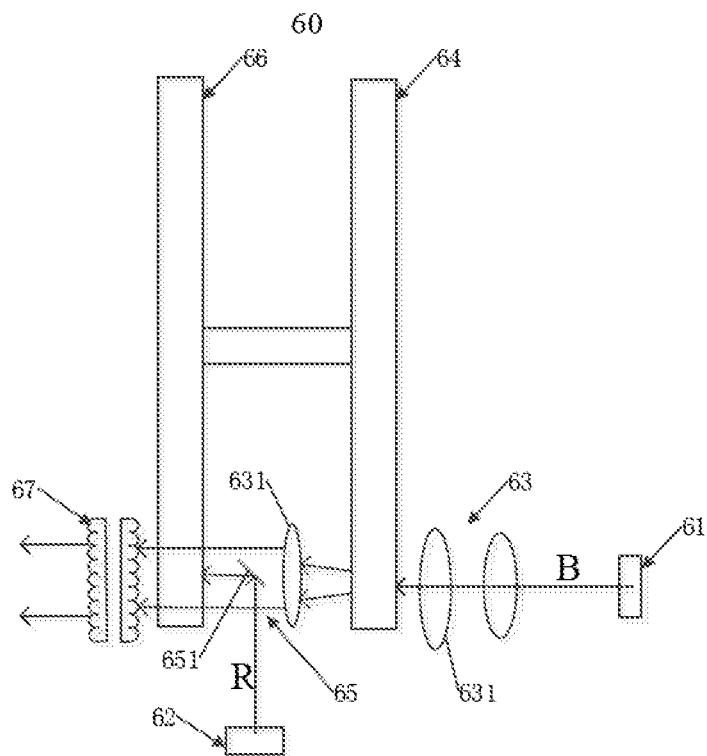
FIG. 9 is a schematic structural diagram of a light source system according to a fifth embodiment of the present invention.

The present embodiment provides another light source system 60. As shown in FIG. 9, the main difference between the light source system 60 and the light source system 50 shown in FIG. 8 lies in structures of the wavelength conversion apparatus 64 and the light-filtering apparatus 66, components included in the first light-guiding assembly 63, and positions of the first supplementary light source 62 and the second light-guiding assembly 65. Specifically, the transmissive color wheel 64 which can be used as the wavelength conversion apparatus and the light-filtering wheel 66 which can be used as the light-filtering apparatus in the present embodiment have a separate structure, and are respectively disposed on the light emission light path of the blue excitation light B emitted by the excitation light source 61 and the excited light, while at least some components of the second light-guiding assembly 65 are disposed in the gap between the transmissive color wheel 64 and the light-filtering wheel 66 which are separated from each other. The above-described light source system 60 provided by the embodiment is described below with a specific example. It is assumed that the excitation light source 61 emits blue excitation light B, and the first supplementary light emitted by the first supplementary light source 62 is red light R. The blue excitation light is firstly incident on the transmissive color wheel 64 via the first condensing lens 631 included in the first light-guiding assembly 63 to generate excited light, and the color of the excited light may be any of the other embodiments described above. After being transmitted by the transmissive color wheel 64, the excited light is incident on the selective optical component 651 of the second light-guiding assembly 65 and irradiate onto the light-filtering wheel 66 together with the red light R. Preferably, the first condensing lens 631 included in the first light-guiding assembly 63 is disposed between the transmissive color wheel 64 and the selective optical component 651, and further, the excited light and the red light R that have passed through the light-filtering wheel 66 are further incident on the fly-eye lens pair 67 which can serve as a light-homogenizing apparatus. In the present embodiment, by disposing the selective optical component 651 of the second light-guiding assembly 65 in the gap between the transmissive color wheel 64 and the light-filtering wheel 66 that are separated from each other, the gap is fully utilized. Therefore, it helps to reduce the overall space occupied by the optical system 60. In addition, in general, the light-filtering wheel 66 also has the function of scattering, i.e., decoherence, so when compared with Embodiment Four, the scattering plate disposed between the first supplementary light source and the selective optical component can also be correspondingly reduced in the present embodiment, thereby saving cost.

Embodiment Six

Figure 10:
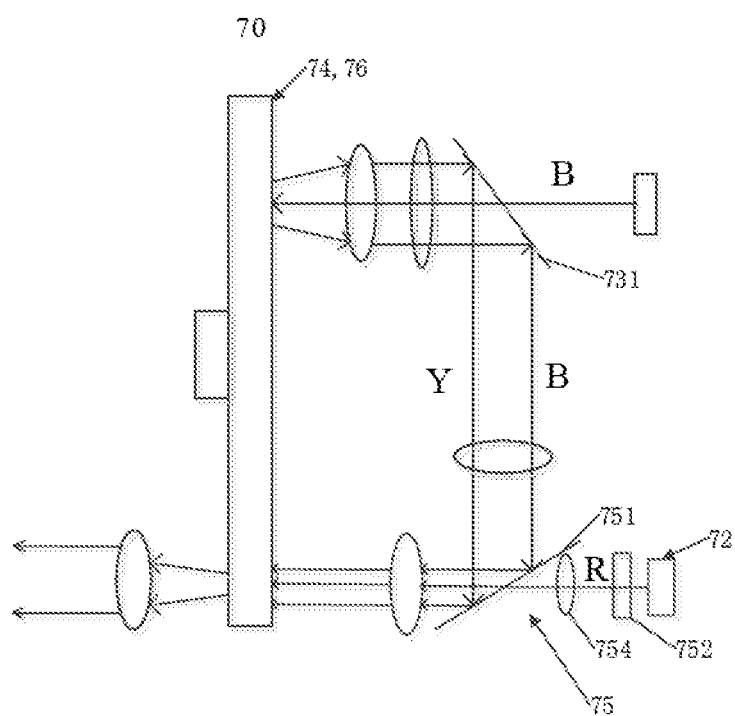
FIG. 10 is a schematic structural diagram of a light source system according to a sixth embodiment of the present invention.

The present embodiment provides another light source system 70. As shown in FIG. 10, the main difference between the light source system 70 and the light source system 50 shown in FIG. 8 lies in positions of the second supplementary light source 72 and the second light-guiding assembly 75, and components included in the second light-guiding assembly 75. Therefore, the same components and light paths as those in FIG. 8 and Embodiment Four will not be described again. Specifically, with reference to FIG. 10, the second light-guiding assembly 75 of the present embodiment includes a selective optical component 751, and the selective optical component 751 transmits the first supplementary light and reflects the excited light or the excited light and the unconverted excitation light so as to enable them to irradiate onto the light-filtering wheel 76 which is disposed outside the color wheel 74 and integrated with the color wheel 74. It can be seen that the second light-guiding assembly 75 can further include a scattering plate 752 and a fourth condensing lens 754 disposed between the first supplementary light source 72 and the selective optical component 751. The above-described light source system 70 provided by the present embodiment will be described below with a specific example. The red light R, which can be used as the first supplementary light, passes through the all-reflective plate 751 which can be used as the selective optical component and be partially coated. The center region of the all-reflective plate 751 is provided with a coating that transmits red light R and reflects yellow excited light Y or yellow excited light Y and unconverted blue excitation light B, while the edge region of the all-reflective plate 751 reflects the yellow excited light Y or the yellow excited light Y and the unconverted blue excitation light B, so that the all-reflective plate 751 guides the red light R and the excited light Y, or the red light R, the yellow excited light Y and the unconverted blue excitation light B to irradiate onto the light-filtering wheel 76. In addition, similarly, with reference to the arrangement of the first supplementary light source 72 with respect to the selective optical component 751, the first supplementary light source 72 may also be disposed relative to the all-reflective plate 731 which is partially coated. In this case, the first supplementary light source 72 is transmitted through the coating of the all-reflective plate 731, and the excited light or the excited light and the unconverted excitation light are reflected by a region other than the coating of the all-reflective plate 731 in order to be together irradiate to the reflecting mirror, while this reflecting mirror has the same function as that of the reflecting mirror described in Embodiment Four. That is, the all-reflective plate 731 described above may transmit the first supplementary light and the excitation light and reflect the excited light or the excited light and the unconverted excitation light. As described above, in the present embodiment, the arrangement position of the first supplementary light source is more flexible, and in addition, with respect to the other embodiments above, it can be understood that the first light-guiding assembly and the second light-guiding assembly actually include the same components, that is, the same components are shared, which helps to reduce the cost of the light source system.

Embodiment Seven

Figure 11:
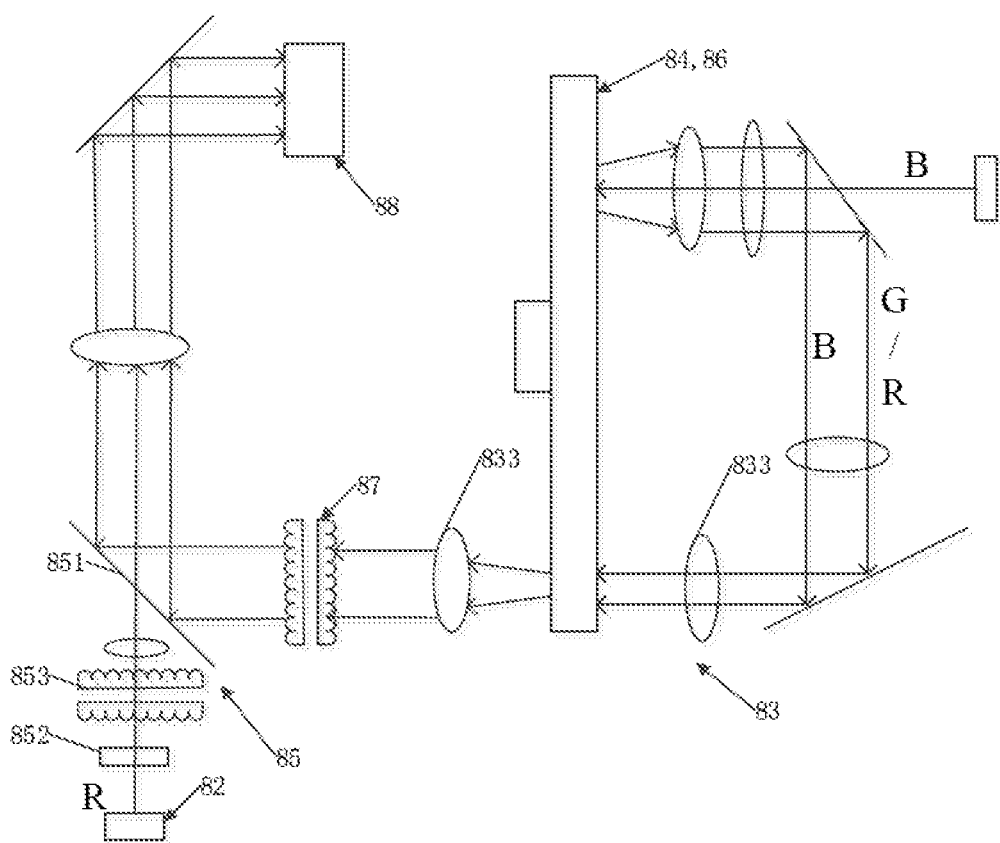
FIG. 11 is a schematic structural diagram of a light source system according to a seventh embodiment of the present invention.

The present embodiment provides another light source system 80. As shown in FIG. 11, since the first supplementary light passes through the optical assembly, there is inevitably a certain loss of light. Therefore, in order to further improve the light-supplement efficiency of the first supplementary light and reduce the number of optical components through which the first supplementary light passes, the first supplementary light source 82 and the second light-guiding assembly 85 in the present embodiment are disposed in a light emission channel of the excited light output from the light-homogenizing apparatus 87. The following is a more specific description of the present embodiment with a specific example, and the components and light paths which are the same as those in FIG. 3 and Embodiment Two will not be described again. The excited light output from the light-filtering wheel 86 disposed outside the color wheel 84 and integrated with the color wheel 84 irradiate to the fly-eye lens pair 87 which can function as a light-homogenizing apparatus, and the excited light which has been light-homogenized and the red light R which can be used as the first supplementary light are output under the guidance of the selective optical component of the all-reflective plate 851 which, for example, is partially coated. Specifically, the red light R can be transmitted through the coating of the all-reflective plate 851. The excited light or the excited light and the unconverted excitation light which has been light-homogenized may be reflected by the region other than the coating of the all-reflective plate 851, and moreover, the coated region may reflect part of the excited light which is incident thereon and of which the wavelength range is different from the wavelength range corresponding to the spectrum of the red light R or not only the wavelength range is different from the wavelength range corresponding to the spectrum of the red light R but the polarization state thereof is also different, so that they are output together. The specific structure and function of the all-reflective plate 851 can be obtained with reference to the above description, and will not be described in detail. The co-emission light is incident on the light valve 88 through the same light emission channel. A reflecting mirror, a condensing lens, etc. may be disposed in the same light emission channel. The light valve can be DMD, LCD, LCOS, and the like. In the present embodiment, with respect to the light path along which the excited light passes through the first condensing lens 833 and is incident on the light-homogenizing apparatus 87, the first supplementary light source 82 and the second light-guiding assembly 85 of the optical system 80 are both disposed behind the light-homogenizing apparatus 87, so that the number of optical components through which the red light R passes can be greatly reduced to reduce light loss of the red light R accordingly, and the light utilization rate of the red light R can be increased to about 90% or more. It can be seen that, in the present embodiment, the first light-guiding assembly 83 includes a first condensing lens 833 and a light-homogenizing apparatus 87, that is, the light-filtering wheel 86 is located between two components, i.e. the two first condensing lenses 833, of the first light-guiding assembly. In addition, in order to decohere and homogenize the first complementary light, a scattering plate 852 and a fly-eye lens pair 853 may be disposed between the first supplementary light source 82 and the all-reflective plate 851. Therefore, even if the first supplementary light is not subjected to the homogenization of the light-homogenizing apparatus 87, a high uniformity can still be ensured.

In view of the above various embodiments, it is apparent that the main object of the present invention is as follows. By reasonably providing a coating on a selective optical component or a coating which is applied to the entire selective optical component, and according to the fact that the etendue of the first supplementary light is smaller than the etendue of the excited light, the first supplementary light and the excited light are light-combined by etendue at the place where the coating is provided. On the basis of this, according to the fact that the wavelength spectrum of the first complementary light is smaller than the wavelength spectrum of the excited light, the first supplementary light and the excited light are also wavelength light-combined at the place where the coating is provided. In addition, it is also possible that the first supplementary light and the excited light can be light-combined regarding the polarization state according to the fact that the polarization of the first complementary light is better (for example, the polarization state of the excited light can be controlled to be substantially one type) and the fact that the excited light includes light of two polarization states (for example, the polarization states of the fluorescence includes two polarization states). That is, by reasonably setting the characteristics of the coating, the first supplementary light and the excited light can be only light-combined by etendue, and furthermore, they can also be wavelength light-combined or/and polarization state light-combined based on the realization of the light-combination by etendue, thereby improving the light-supplement efficiency of the first complementary light and reducing the loss of the excited light. Moreover, co-emission of the first supplementary light and the excited light described herein include a case where any of the above-described light combining modes is adopted such that the first complementary light and part of the excited light are collectively passing through the coating and output therefrom. Regarding the reasonable arrangement of the above coating, it can be obtained by referring to the contents described in Embodiment Two and FIGS. 4 and 5, and Embodiment Three and FIG. 7 in combination with the process and method for making a coating in the prior art. In addition, it can be seen that the reflectance or transmittance curves of the center film of the light-filtering plate, the polarizing plate disposed at the center region of the light-filtering plate, the second coating disposed at the center region of the wavelength light-filtering plate, the coating of the separate reflecting plate or the polarizing plate described herein can be set with reference to the above description, thereby obtaining the corresponding technical effects. In addition, the coating described herein is merely a specific example and should not be construed as limiting the present invention. All optical components are within the protection scope of the present invention as long as they can function as the coatings herein and selectively transmit and reflect different light.

The present invention also provides a projection device including a light source system of any of the above embodiments.

It should be noted that, according to the actual situation, the light-homogenizing component and the light-homogenizing apparatus described above may respectively adopt a light-homogenizing rod or a fly-eye lens pair. The above description mainly illustrates an example in which the red light is taken as the first supplementary light, but it should not be limited to this, while the first supplementary light may also be green light, blue light, or the like. In addition, the structure and position of the light-filtering apparatus can also be set according to the color of the light passing through the light-filtering apparatus and the actual needs of the co-emission light path direction. For example, unlike the case where the rotating axis of the light-filtering wheel and the rotating axis of the color wheel are coincident or parallel as described above, the rotating axis of the light-filtering wheel can also be arranged at a certain angle of preferably 45° with respect to the rotating axis of the color wheel. Furthermore, the selective optical component can selectively transmit or/and reflect at least part of the excited light depending on the wavelength of the light incident thereon, the polarization state thereof, or a combination of the two. Moreover, the combination of the technical means for reflecting and transmitting the excitation light and the excited light used in the above light path can be modified according to actual needs. For example, the X-mirror can be used to replace the all-reflective plate. At this time, the excitation light can be reflected by the X-mirror to the color wheel, while the excited light can also be reflected by the X-mirror to the reflecting mirror. In addition, a structure in which the transmissive color wheel and the light-filtering wheel form an integral structure can be adopted. At this time, the first light-guiding assembly further includes a reflecting component that is disposed in the light path of the excited light path and used for reflecting the excited light to the light-filtering wheel. Furthermore, the co-emission described above can be understood as that two or more light beams are output at the same time, and it can also be understood as that more than one light sequences are output. Description of co-emission is mainly intended to indicate that the light emission channel from which the respective light is output is the same, which should not be construed as limitation.

The above embodiments are only the preferred embodiments of the present invention, and are not intended to limit the scope of the present invention. All the equivalent structures made by taking advantages of the specification and the drawings of the present invention or those directly and indirectly applied to other related technical fields are included in the protection scope of the present invention.

The invention claimed is:

1. A light source system, comprising an excitation light source, a first supplementary light source, a first light-guiding assembly, a wavelength conversion apparatus, and a second light-guiding assembly,
    wherein the excitation light source is configured to emit excitation light;
    wherein the first light-guiding assembly is disposed at a side of the wavelength conversion apparatus and configured to guide the excitation light to the wavelength conversion apparatus, and the wavelength conversion apparatus is configured to convert the excitation light to excited light and guide the excited light to the second light-guiding assembly;
    wherein the first supplementary light source is disposed at another side of the wavelength conversion apparatus and configured to emit first supplementary light;
    wherein the first supplementary light has a spectral range that is narrower than a spectral range of the excited light, the first supplementary light has an etendue that is smaller than an etendue of the excited light, and the second light-guiding assembly is configured to perform light-combination on the excited light and the first supplementary light by etendue and emit the excited light and the first supplementary light through a same light emission channel;
    wherein the first supplementary light is one or more of red light or green light, and the excited light is yellow fluorescence;
    wherein the second light-guiding assembly comprises a selective optical component, the selective optical component is configured to reflect/transmit the first supplementary light or reflect/transmit the first supplementary light and transmit/reflect at least part of the excited light; and
    wherein the second light-guiding assembly further comprises a second condensing lens that is configured to converge the first supplementary light to the selective optical component, and a converging focus of the first supplementary light is on the selective optical component.

2. The light source system according to claim 1, wherein the selective optical component is a light-filtering plate configured to reflect the first supplementary light and transmit at least part of the excited light, or the selective optical component is one or more of a reflecting/polarizing plate that is at least partially coated with film and configured to reflect the first supplementary light rather than the at least part of the excited light, or a light-filtering plate that is partially coated with film or provided with a polarizing plate.

3. The light source system according to claim 2, wherein the selective optical component comprises a center region, and an area of the center region matches a size of a spot of the first supplementary light.

4. The light source system according to claim 3, wherein the area of the center region of the selective optical component is smaller than 50% of an area of the spot of the first supplementary light.

5. The light source system according to claim 1, further comprising:
    a light-filtering apparatus located between the first light-guiding assembly and the second light-guiding assembly, or located in the same light emission channel.

6. The light source system according to claim 5, wherein the wavelength conversion apparatus is a reflective color wheel, the light-filtering apparatus is a light-filtering wheel, and the light-filtering wheel is disposed on an outer circumference or an inner circumference of the reflective color wheel and forms an integral structure with the reflective color wheel.

7. The light source system according to claim 6, wherein the second light-guiding assembly is located between the first light-guiding assembly and the light-filtering wheel, or located at downstream of a light path of the excited light emitted from the light-filtering wheel.

8. A light source system, comprising an excitation light source, a first supplementary light source, a first light-guiding assembly, a wavelength conversion apparatus, a light-homogenizing apparatus, and a second light-guiding assembly comprising a light-homogenizing component,
    wherein the excitation light source is configured to emit excitation light;
    wherein the first supplementary light source is configured to emit first supplementary light;
    wherein the first light-guiding assembly is disposed at a side of the wavelength conversion apparatus and configured to guide the excitation light to the wavelength conversion apparatus, and the wavelength conversion apparatus is configured to convert the excitation light to excited light and emit the excited light;
    wherein the light-homogenizing apparatus is disposed in a light emission channel of the excited light and configured to homogenize the excited light, and after being homogenized, the excited light is guided to the second light-guiding assembly through the first light-guiding assembly;
    wherein the light-homogenizing component is disposed in a light emission channel of the first supplementary light and configured to homogenize the first supplementary light, and after being homogenized, the first supplementary light is emitted to the second light-guiding assembly;

wherein after the excited light homogenized by the light-homogenizing apparatus and the first supplementary light homogenized by the light-homogenizing component is light-combined by etendue, the second light-guiding assembly is configured to guide the excited light and the first supplementary light to exit through a same light emission channel; and wherein the light-homogenizing component is different from the light-homogenizing apparatus.

9. The light source system according to claim 8, wherein the second light-guiding assembly comprises a selective optical component, the selective optical component is configured to reflect/transmit the first supplementary light or reflect/transmit the first supplementary light and transmit/reflect at least part of the excited light.

10. The light source system according to claim 9, wherein the selective optical component is a light-filtering plate configured to reflect the first supplementary light and transmit at least part of the excited light, or the selective optical component is one or more of a reflecting/polarizing plate that is at least partially coated with film and configured to reflect the first supplementary light rather than the at least part of the excited light, or a light-filtering plate that is partially coated with film or provided with a polarizing plate.

11. The light source system according to claim 10, wherein the selective optical component comprises a center region, and an area of the center region matches a size of a spot of the first supplementary light.

12. The light source system according to claim 11, wherein the area of the center region of the selective optical component is smaller than 50% of an area of the spot of the first supplementary light.

13. The light source system according to claim 9, wherein the second light-guiding assembly further comprises a second condensing lens that is configured to converge the first supplementary light to the selective optical component, and a converging focus of the first supplementary light is on the selective optical component.

14. The light source system according to claim 8, further comprising:
a light-filtering apparatus located in the same light emission channel.

15. A light source system, comprising an excitation light source, a first supplementary light source, a first light-guiding assembly, a wavelength conversion apparatus, and a second light-guiding assembly,
wherein the excitation light source is configured to emit excitation light;
wherein the first light-guiding assembly is disposed at a side of the wavelength conversion apparatus and configured to guide the excitation light to the wavelength conversion apparatus, and the wavelength conversion apparatus is configured to convert the excitation light to excited light and guide the excited light to the second light-guiding assembly;
wherein the first supplementary light source is disposed at another side of the wavelength conversion apparatus and configured to emit first supplementary light;
wherein an etendue of the first supplementary light is smaller than an etendue of the excited light, and the second light-guiding assembly is configured to perform light-combination on the excited light and the first supplementary light by etendue and emit the excited light and the first supplementary light through a same light emission channel;
wherein the second light-guiding assembly comprises a selective optical component that comprises a center region, an area of the center region matches a size of a spot of the first supplementary light, the first supplementary light is guided to the light emission channel through the center region and emitted from the light emission channel, at least part of the excited light is transmitted through a periphery of the center region, and then the at least part of the excited light and the first supplementary light are emitted through the same light emission channel; and wherein the second light-guiding assembly further comprises a second condensing lens that is configured to converge the first supplementary light to the selective optical component, and a converging focus of the first supplementary light is on the selective optical component.

16. The light source system according to claim 15, wherein the area of the center region of the selective optical component is smaller than 50% of an area of the spot of the first supplementary light.

17. The light source system according to claim 15, further comprising:
a light-homogenizing apparatus, wherein the second light-guiding assembly comprises a light-homogenizing component,
wherein the light-homogenizing apparatus is disposed in the light emission channel of the excited light and configured to homogenize the excited light, and after being homogenized, the excited light is guided to the selective optical component through the first light-guiding assembly;
wherein the light-homogenizing component is disposed in the light emission channel of the first supplementary light and configured to homogenize the first supplementary light, and after being homogenized, the first supplementary light is emitted to the selective optical component; and
wherein after the excited light homogenized by the light-homogenizing apparatus and the first supplementary light homogenized by the light-homogenizing component is light-combined by etendue, the second light-guiding assembly is configured to guide the excited light and the first supplementary light to exit through the same light emission channel, and the light-homogenizing component is different from the light-homogenizing apparatus.

18. The light source system according to claim 15, further comprising:
a light-filtering apparatus located between the first light-guiding assembly and the second light-guiding assembly, or located in the same light emission channel.

19. The light source system according to claim 15, wherein the first supplementary light is one or more of red light, green light, or blue light.

20. The light source system according to claim 15, wherein two first supplementary light sources are provided, and the two first supplementary light sources respectively emit red light and green light as the first supplementary light, the second light-guiding assembly further comprises a light-splitting component, and the red light and the green light irradiate onto the selective optical component through the light-splitting component.

* * * * *